US008229603B2

(12) United States Patent
Miyata et al.

(10) Patent No.: US 8,229,603 B2
(45) Date of Patent: Jul. 24, 2012

(54) IN-VEHICLE EQUIPMENT CONTROL DEVICE

(75) Inventors: Masahiko Miyata, Aichi (JP); Katsuhide Kumagai, Aichi (JP); Norio Yamamoto, Kariya (JP); Nozomi Kitagawa, Okazaki (JP)

(73) Assignees: Kabushiki Kaisha Tokai Rika Denki Seisakusho, Aichi (JP); Denso Corporation, Aich-ken (JP)

( * ) Notice: Subject to any disclaimer, the term of this patent is extended or adjusted under 35 U.S.C. 154(b) by 1086 days.

(21) Appl. No.: 12/099,510

(22) Filed: Apr. 8, 2008

(65) Prior Publication Data

US 2008/0249668 A1 Oct. 9, 2008

(30) Foreign Application Priority Data

Apr. 9, 2007 (JP) ................................ 2007-101596

(51) Int. Cl.
*G06F 3/033* (2006.01)
(52) U.S. Cl. .................. 701/1; 701/36; 701/41; 701/49; 345/156; 345/161; 345/173
(58) Field of Classification Search ........................ None
See application file for complete search history.

(56) References Cited

U.S. PATENT DOCUMENTS

| | | | | | |
|---|---|---|---|---|---|
| 4,787,040 | A | * | 11/1988 | Ames et al. ........................ 701/1 |
| 4,899,138 | A | * | 2/1990 | Araki et al. .................... 345/175 |
| 5,404,443 | A | * | 4/1995 | Hirata .............................. 725/75 |
| 5,555,502 | A | * | 9/1996 | Opel ............................... 701/36 |
| 5,798,758 | A | * | 8/1998 | Harada et al. ................. 715/863 |
| 5,864,105 | A | * | 1/1999 | Andrews ........................ 200/5 R |
| 5,995,104 | A | * | 11/1999 | Kataoka et al. ................ 715/848 |
| 6,053,066 | A | * | 4/2000 | Ishii et al. ..................... 74/473.18 |
| 6,157,372 | A | * | 12/2000 | Blackburn et al. ............. 345/173 |
| 6,563,492 | B1 | * | 5/2003 | Furuya ............................ 345/178 |
| 6,661,406 | B1 | * | 12/2003 | Enoki ............................. 345/173 |

(Continued)

FOREIGN PATENT DOCUMENTS

EP        1 046 565 A2    10/2000

(Continued)

OTHER PUBLICATIONS

Official Action dated Jun. 21, 2011 received from the Japanese Patent Office from related Japanese Application No. 2007-101596, together with a partial English-language translation.

(Continued)

*Primary Examiner* — Jonathan M Dager
(74) *Attorney, Agent, or Firm* — Scully, Scott, Murphy & Presser, PC

(57) ABSTRACT

An in-vehicle equipment control device includes a force sense imparting type input device mounted on a steering of a vehicle, for remotely operating an in-vehicle equipment mounted on the vehicle according to a predetermined operation route while imparting a force sense, a storage unit for storing an operation route data to conduct an input operation of the force sense imparting type input device with a predetermined operation route, and a control unit for conducting an arithmetic process to transform the predetermined operation route of the force sense imparting type input device based on a rotation angle detection signal which is output in accordance with the rotation of the steering of the vehicle and the operation route data stored in the storage unit, to impart the force sense to the force sense imparting type input device based on a result of the arithmetic process.

4 Claims, 9 Drawing Sheets

U.S. PATENT DOCUMENTS

| | | | | |
|---|---|---|---|---|
| 6,819,990 | B2 * | 11/2004 | Ichinose | 701/36 |
| 6,859,003 | B2 * | 2/2005 | Hayasaka | 318/281 |
| 7,084,859 | B1 * | 8/2006 | Pryor | 345/173 |
| 7,126,583 | B1 * | 10/2006 | Breed | 345/158 |
| 7,158,871 | B1 * | 1/2007 | Ilan et al. | 701/49 |
| 7,177,473 | B2 * | 2/2007 | Aharonson | 382/187 |
| 7,295,904 | B2 * | 11/2007 | Kanevsky et al. | 701/36 |
| 7,410,202 | B2 * | 8/2008 | Rose et al. | 296/146.2 |
| 7,429,976 | B2 * | 9/2008 | Harley et al. | 345/157 |
| 7,574,020 | B2 * | 8/2009 | Shamaie | 382/103 |
| 7,586,480 | B2 * | 9/2009 | Sachs et al. | 345/157 |
| 7,693,631 | B2 * | 4/2010 | Yukawa et al. | 701/36 |
| 7,761,204 | B2 * | 7/2010 | Konig | 701/36 |
| 7,834,857 | B2 * | 11/2010 | Prados | 345/173 |
| 8,026,902 | B2 * | 9/2011 | Medler et al. | 345/173 |
| 2003/0128103 | A1 * | 7/2003 | Fitzpatrick et al. | 340/425.5 |
| 2004/0054446 | A1 * | 3/2004 | Sanpei et al. | 701/1 |
| 2004/0095369 | A1 | 5/2004 | Takeuchi et al. | |
| 2004/0108993 | A1 * | 6/2004 | Suzuki et al. | 345/156 |
| 2004/0122572 | A1 * | 6/2004 | Ichinose | 701/36 |
| 2004/0140950 | A1 * | 7/2004 | Onodera | 345/156 |
| 2004/0257200 | A1 * | 12/2004 | Baumgardner et al. | 340/5.72 |
| 2005/0021190 | A1 * | 1/2005 | Worrell et al. | 701/1 |
| 2005/0052426 | A1 * | 3/2005 | Hagermoser et al. | 345/173 |
| 2005/0057528 | A1 * | 3/2005 | Kleen | 345/173 |
| 2005/0143870 | A1 * | 6/2005 | Yoshio et al. | 701/2 |
| 2006/0176270 | A1 * | 8/2006 | Sachs | 345/156 |
| 2007/0057922 | A1 * | 3/2007 | Schultz et al. | 345/173 |
| 2007/0139374 | A1 * | 6/2007 | Harley | 345/157 |
| 2007/0255468 | A1 * | 11/2007 | Strebel et al. | 701/49 |
| 2008/0162032 | A1 * | 7/2008 | Wuersch et al. | 701/201 |
| 2008/0243333 | A1 * | 10/2008 | Uchiyama et al. | 701/36 |
| 2009/0322499 | A1 * | 12/2009 | Pryor | 340/407.2 |
| 2010/0073291 | A1 * | 3/2010 | Hisatsugu et al. | 345/161 |
| 2011/0220480 | A1 * | 9/2011 | Yorino | 200/5 A |

FOREIGN PATENT DOCUMENTS

| | | |
|---|---|---|
| EP | 1 411 409 A1 | 4/2004 |
| JP | 2001-160336 A | 6/2001 |
| JP | 2003-140810 | 5/2003 |
| JP | 2004-042680 A | 2/2004 |
| JP | 2004-171157 A | 6/2004 |
| JP | 2004-284516 | 10/2004 |
| JP | 2008250793 A * | 10/2008 |

OTHER PUBLICATIONS

Extended European Search Report dated May 3, 2012 from related European Application No. 08103443.1.

* cited by examiner

IN-VEHICLE EQUIPMENT CONTROL DEVICE

The present application is based an Japanese Patent Application No. 2007-101596 filed on Apr. 9, 2007, the entire contents of which are incorporated herein by reference.

BACKGROUND OF THE INVENTION

1. Filed of the Invention

The present invention relates to an in-vehicle equipment control device for controlling in-vehicle equipments mounted on a vehicle, in more particular, to an in-vehicle equipment control device for remotely operating the in-vehicle equipments by a force sense imparting type input device mounted on a steering.

Herein, it is to be noted that the term "force sense imparting" means a technique of feeling a calculated world through an actual body feeling, namely, a technique of imparting an operation feeling by a so-called "virtual reality".

2. Related Art

Various in-vehicle equipments such as audio equipment, air conditioner, and car navigation system are mounted in a vehicle. As an example of input operations for the in-vehicle equipments, an operation pattern etc. is displayed on a display monitor and an input operation device is operated based on this displayed information.

For examples there is an in-vehicle equipment control device configured to impact a force sense by a manual operation part, a monitor, and a control means. For example JP-A-2003-140810 discloses this type of the in-vehicle equipment control device. The manual operation part comprises a casing, an operating shaft, a knob bonded to an upper end of the operating shaft, an elastic member for biasing the knob downwards at all times, a guide board of the knob to which a lower end of the operating shaft is elastically connected, and a detecting means for detecting an operating position of the knob. A groove in a cross shape having a width for receiving a tip portion of the operating shaft is formed on the guide board and an asperity (convexo-concave portion) is formed on a bottom surface of this groove. Meanwhile, an image of the groove formed on the guide board, an image of the asperity formed on the bottom surface of the groove, and a circular marking indicating an actual location of the knob are displayed three-dimensionally on the monitor.

According to the device disclosed by JP-A-2003-140810, since it is possible to display an operational feeling by the three-dimensional display on the monitor and also possible to impart the force sense by the control means when operating the knob, it is possible to learn the operational feeling accurately regardless vibrations of the vehicle.

The in-vehicle equipment control device disclosed by JP-A-2003-140810 has above-mentioned effects, when a positional relationship between the manual operation part and the monitor is constant. However, the positional relationship between the manual operation part and the monitor will be varied, when the manual operation part is mounted on for example the steering and the steering is rotated. When a driver conducts the input operation of the in-vehicle equipments by operating the manual operation part based on the monitor information in such a state, it is difficult for the driver to operate the in-vehicle equipments and an operational error is also assumed.

THE SUMMARY OF THE INVENTION

Therefore, it is an object of the invention to provide an in-vehicle equipment control device, by which it is possible to conduct the same operation as the operation route pattern displayed on the display monitor, and to easily conduct the operation, as well as operational error hardly occurs, even when a force sense imparting type input device is mounted on a steering of a vehicle.

[1] According to a feature of the present invention, an in-vehicle equipment control device comprises:

a force sense imparting type input device mounted on a steering of a vehicle, for remotely operating an in-vehicle equipment mounted on the vehicle according to a predetermined operation route while imparting a force sense;

a storage unit for storing an operation route data to conduct an input operation of the force sense imparting type input device with a predetermined operation route; and a control unit for conducting an arithmetic process to transform the predetermined operation route of the force sense imparting type input device based on a rotation angle detection signal which is output in accordance with the rotation of the steering of the vehicle and the operation route data stored in the storage unit, to impart the force sense to the force sense imparting type input device based on a result of the arithmetic process.

[2] In the in-vehicle equipment control device according to the feature [1], the control unit may comprise a judgment unit which compares the rotation angle detection signal with a threshold angle and judges whether or not to conduct the arithmetic process based on a result of the comparison.

[3] In the in-vehicle equipment control device according to the feature [2], the judgment unit may judge whether the rotation detection angle is greater or less than the threshold angle.

[4] In the in-vehicle equipment control device according to the feature [1], the control unit may comprise a judgment unit which compares a running speed of the vehicle with a predetermined threshold speed and judges whether or not to conduct the arithmetic process based on a result of the comparison.

[5] In the in-vehicle equipment control device according to the feature [4], the judgment unit may judge whether the vehicle running speed is greater or less than the threshold speed.

[6] In the in-vehicle equipment control device according to the feature [1], the storage unit may store a monitor display data for displaying operation patterns of the in-vehicle equipment to be operated on a display monitor, and operation route data in the state that the operation patterns of the force sense imparting type input device are not rotated by a steering shaft.

[7] In the in-vehicle equipment control device according to the feature [1], the rotation angle detection signal may represent a rotation detection angle which is input from a rudder angle sensor of the vehicle.

[8] In the in-vehicle equipment control device according to the feature [1], the force sense imparting type input device may be connected to the control unit, and position coordinates input by an operating knob are output to the control unit from the force sense imparting type input device.

[9] In the in-vehicle equipment control device according to the feature [1], the force sense imparting type input device may be connected to the control unit, and a drive signal for imparting the force sense is input to the force sense imparting type input device from the control unit

[10] In the in-vehicle equipment control device according to the feature [1], the in-vehicle equipment to be operated may be remotely operated based on information of an input operation of the force sense imparting type input device.

[11] In the in-vehicle equipment control device according to the feature [1], the force sense imparting type input device may comprise:

a knob shaft attached to an operation knob;

an X carriage which butts to the knob shaft in an X direction and slides with the knob shaft in a Y direction to slidably move along the X direction;

a Y carriage positioned in orthogonal to the X carriage, the Y carriage butting to the knob shaft in the Y direction and sliding with the knob shaft in the X direction to slidably move along the Y direction;

a voice coil motor mounted on each of the X carriage and the Y carriage for imparting the force sense; and a liner potentiometer for detecting travel distances of the X carriage and Y carriage respectively.

[12] In the in-vehicle equipment control device according to the feature [11], the X carriage and the Y carriage may be supported by liner slide guides, and the linear slide guides are installed to the base to be slidably movable in the X and Y directions, respectively.

[13] In the in-vehicle equipment control device according to the feature [11], the voice coil motor may comprise a voice coil fixed on the X carriage or Y carriage, and a magnetic circuit comprising a magnet and a yoke made of a soft magnetic material

[14] In the in-vehicle equipment control device according to the feature [13], the voice coil may be subjected to an electromagnetic force according to the Fleming's left-hand rule by applying the current through the conductive wire and activates the driving force to the X carriage or the Y carriage.

[15] According to another feature of the invention, a method for controlling an in-vehicle equipment control device by a force sense imparting type input device mounted on a steering of a vehicle, for remotely operating an in-vehicle equipment mounted on the vehicle according to a predetermined operation route while imparting a force sense comprises:

a rotational transformation step of conducting an arithmetic process for a rotational transformation based on a rotation detection angle that is output in accordance with a rotation of the steering of the vehicle and an operation route data stored in a storage unit, to create a new operation route data $(x_1, y_1)$ after the rotational transformation;

a force sense imparting step of imparting the force sense to the force sense imparting type input device based on the new operation route data; and an in-vehicle equipment operation step of creating a new operation route data (x', y') by conducting an arithmetic process for an inverse rotation transformation based on the operation route data $(x_1, y_1)$, thereby remotely operating the in-vehicle equipment,

[16] In the method for controlling the in-vehicle equipment control device according to the feature [15], the rotational transformation step may proceeds after an angle judgment step of comparing a rotation detection angle that is output in accordance with a rotation of the steering of the vehicle with a threshold angle $\theta_0$ stored as a judgment data in the storage unit, and a speed judgment step of comparing a running speed of the vehicle and a threshold speed $v_0$ stored as the judgment data in the storage unit.

[17] In the method for controlling the in-vehicle equipment control device according to the feature [15], the rotational transformation step may comprise a judgment step of judging as to whether the vehicle is running or stopping.

[18] In the method for controlling the in-vehicle equipment control device according to the feature [16] the rotational transformation step may proceed when the rotation angle is judged to be greater than the threshold angle $\theta_0$ at the angle judgment step and the running speed is judged to be less than the threshold speed $v_0$ at the speed judgment step.

[19] In the method for controlling the in-vehicle equipment control device according to the feature [16]

the in-vehicle equipment operation step may proceed when the rotation detection angle is judged to be less than the threshold angle $\theta_0$ at the angle judgment step, or when the running speed is judged to be greater than the threshold speed $v_0$ at the speed judgment step.

[20] According to a still another feature of the invention, a method for controlling an in-vehicle equipment control device by a force sense imparting type input device mounted on a steering of a vehicle, for remotely operating an in-vehicle equipment mounted on the vehicle according to a predetermined operation route while imparting a force sense, comprises:

a comparison step of comparing a rotation detection angle that is output in accordance with a rotation of the steering of the vehicle and angles each of which corresponding to a force sense pattern stored a storage unit;

a force sense pattern reading step of reading the force sense pattern corresponding to the angle closest to tie rotation detection angle; and a force sense imparting step of imparting the force sense to the force sense imparting type input device based on the force sense pattern.

(Effect of the Invention)

According to present invention, it is possible to provide the in-vehicle equipment control device, by which it is possible to conduct the same operation as the operation route pattern displayed on the display monitor, and to easily conduct the operation, as well as operational error hardly occurs, even when a force sense imparting type input device is mounted on a steering of a vehicle.

BRIEF DESCRIPTION OP THE DRAWINGS

Next, the present invention wilt be explained in more detail in conjunction with appended drawings, wherein.

Figure 3A:
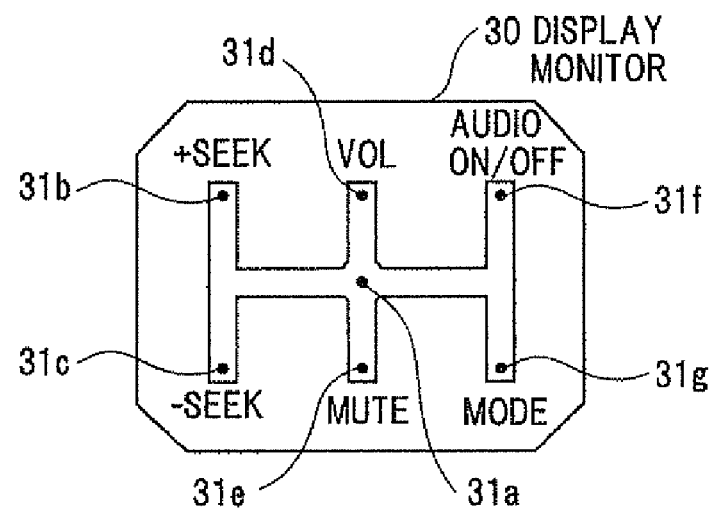
Figure 3B:
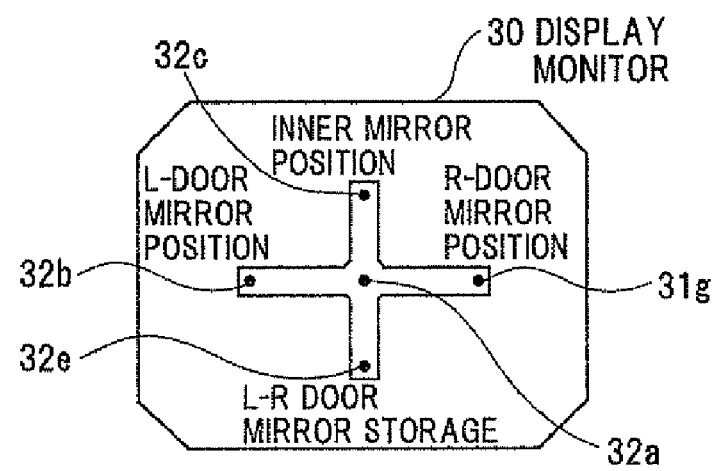
Figure 4A:
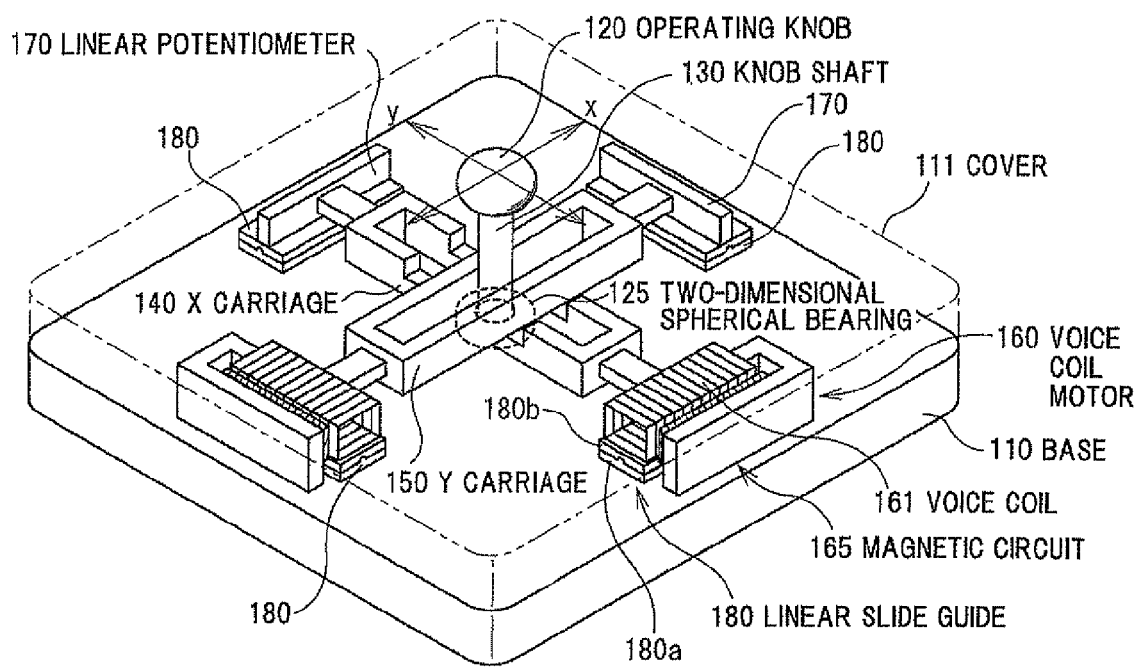
Figure 4B:
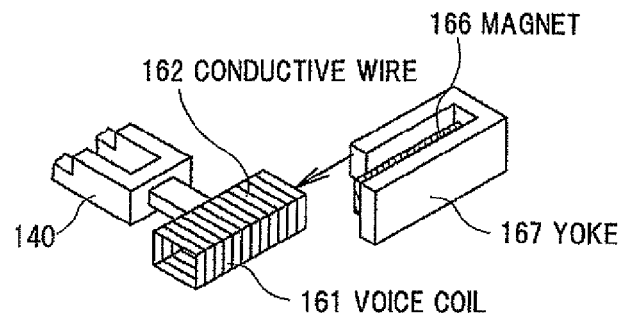
Figure 5A:
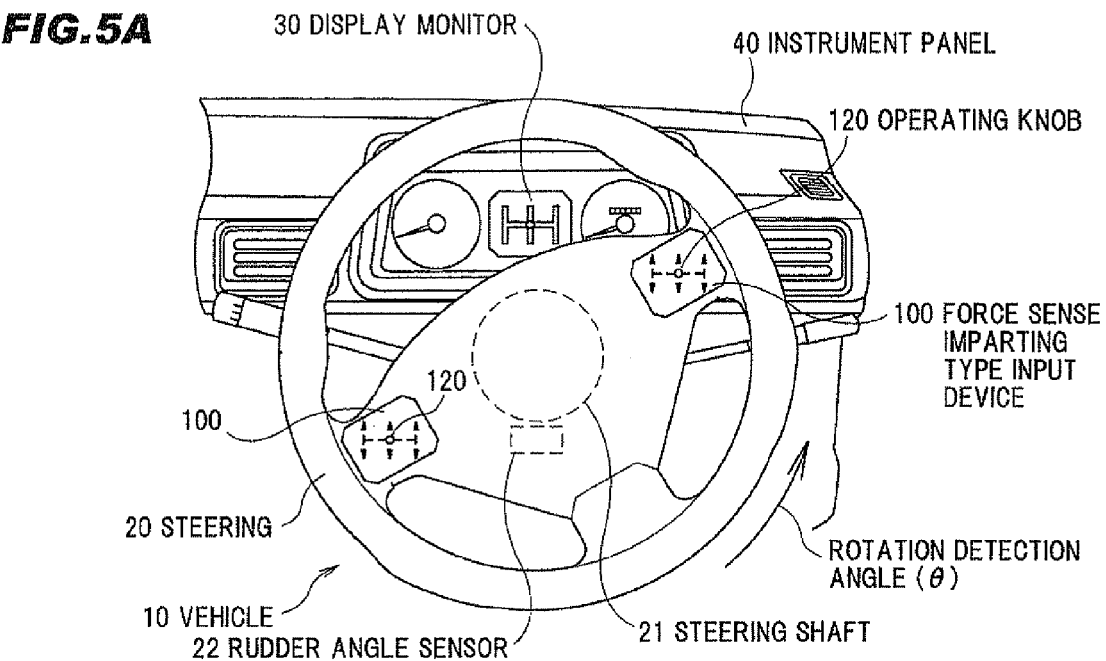
Figure 5B:
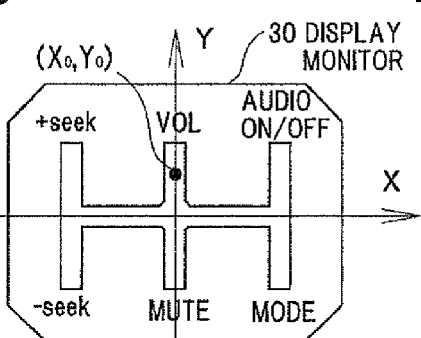
Figure 5C:
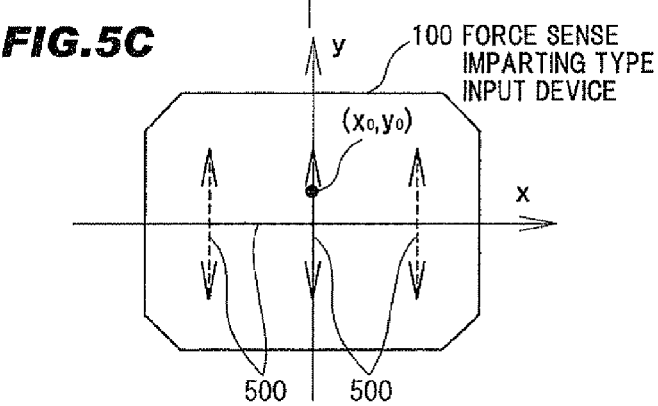
Figure 5D:
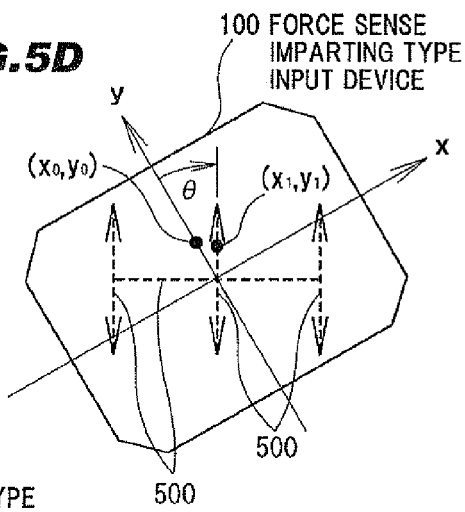
Figure 6:
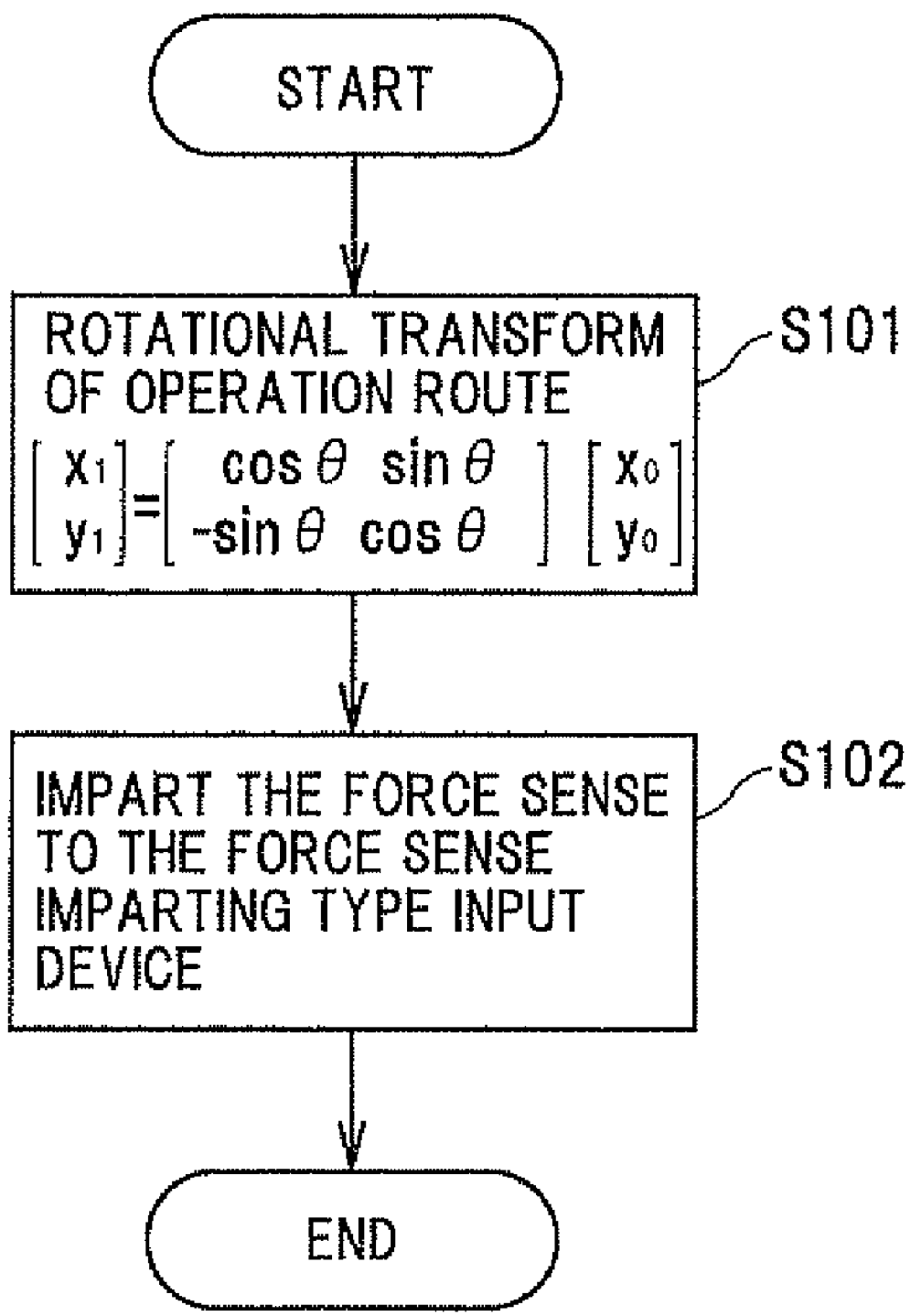
Figure 7:
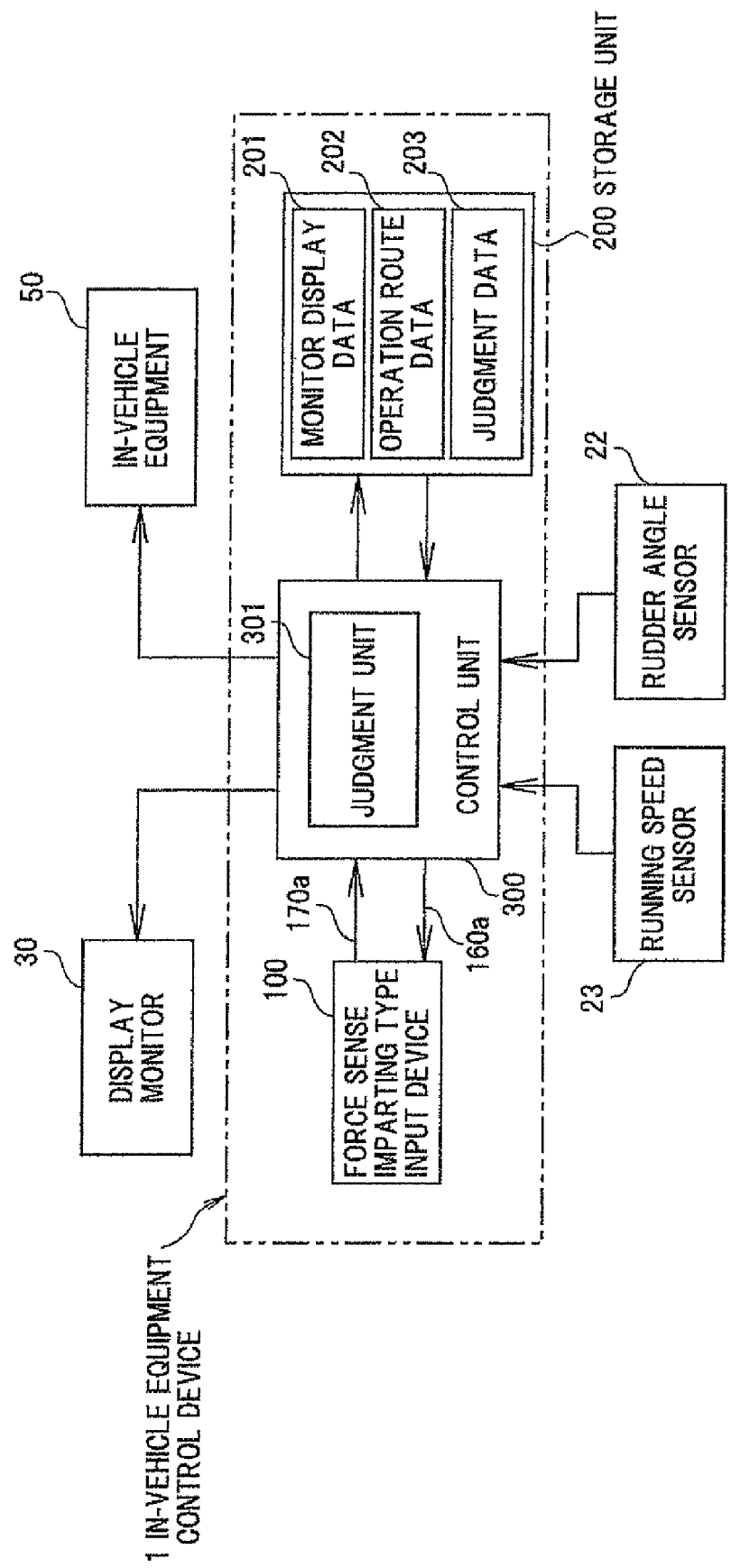
Figure 8:
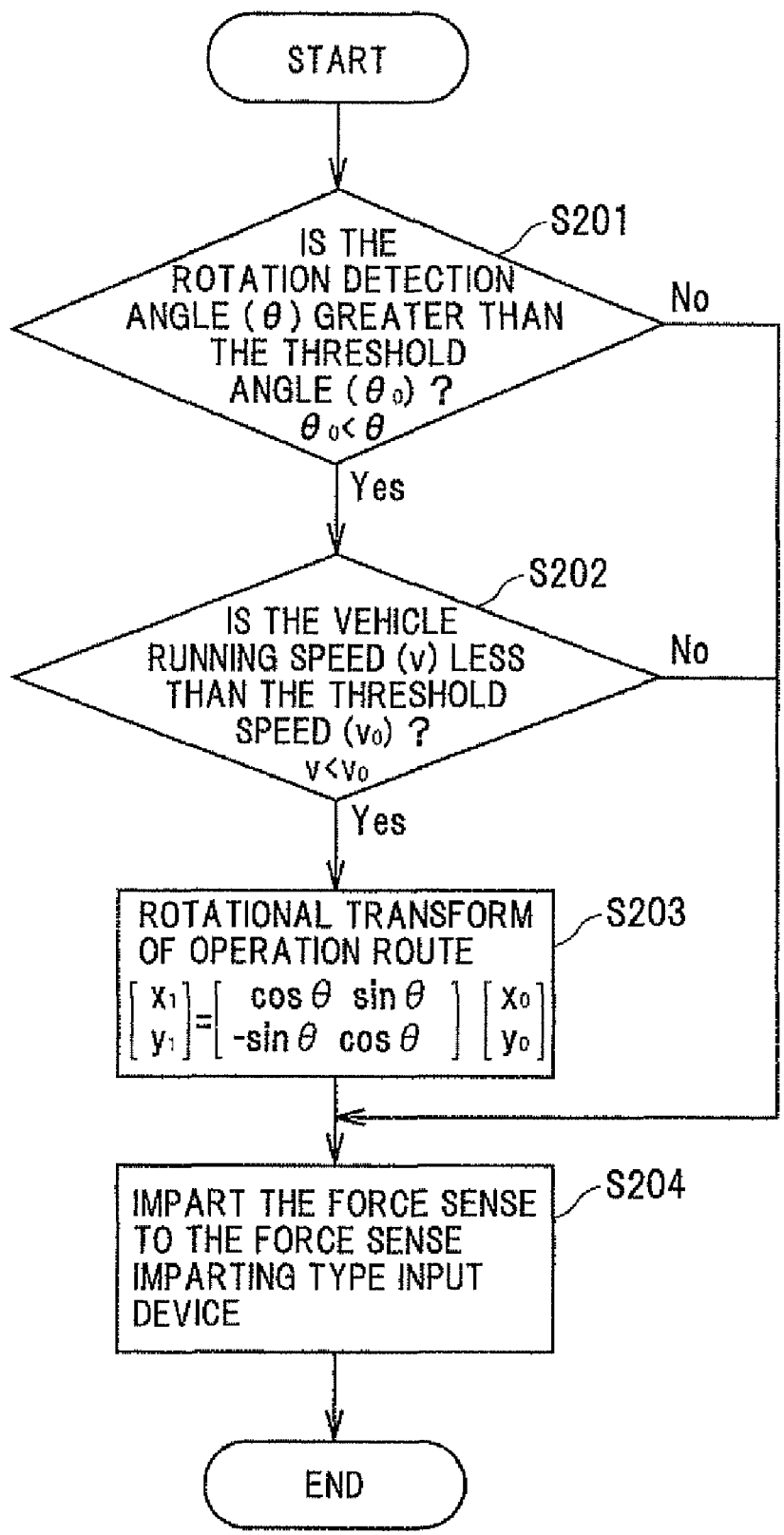
Figure 9:
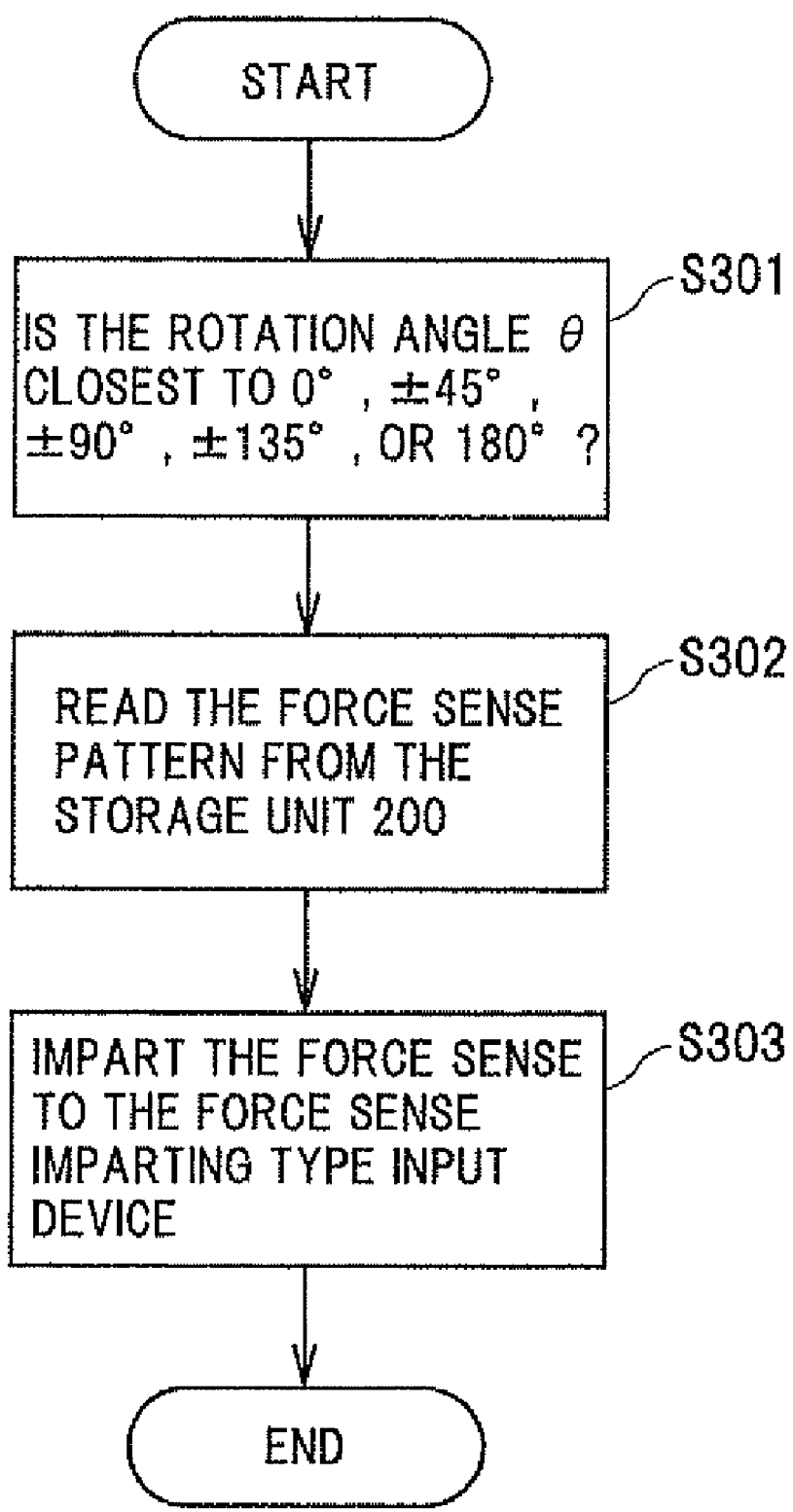

FIG. 3A is a diagram showing an example of an operation pattern stored as a monitor display data 201 in a storage unit 200, and FIG. 3B is a diagram showing another example of the operation pattern stored as the monitor display data 201 in the storage unit 200;

FIG. 4A is a perspective view showing a configuration of the force sense imparting type input device 100 and FIG. 4B is an exploded perspective view showing a part of a voice coil motor 160;

FIG. 5A is a diagram showing the position of the force sense imparting type input device 100 and a route pattern of an operating knob 120 when a steering 20 is rotated by an angle θ in a counterclockwise direction, FIG. 5B is a diagram showing an example of an operation route pattern of an audio equipment that is displayed on a display monitor 30, FIG. 5C is a diagram showing a route pattern of the operating knob 120 of the force sense imparting type input device 100 when a rotation angle of the steering 20 is 0, and FIG. 5D is a diagram showing the route pattern of the operating knob 120 of the force sense imparting type input device 100 when the rotation angle of the steering 20 is θ(≠0);

FIG. 6 is a flow chart showing a control flow in a control unit 300 in the first preferred embodiment;

FIG. 7 is a configuration diagram showing an interconnection of an in-vehicle equipment control device 1 and peripheral devices relating thereto in a second preferred embodiment; and FIG. 8 is a flow chart showing a control flow in a control unit 300 and a judgment unit 301 in the second preferred embodiment; and FIG. 9 is a flow chart showing a control flow in a control unit 300 and a judgment unit 301 in a third preferred embodiment.

DESCRIPTION OF THE PREFERRED EMBODIMENTS (In-Vehicle Equipment Control Device in the First Preferred Embodiment)

An in-vehicle equipment control device 1 in the first preferred embodiment comprises a force sense imparting type input device 100 mounted on a steering of a vehicle, a storage unit 200 for storing operation route data to conduct an input operation of the force sense imparting the input device 100 with a predetermined operation route, and a control unit 300 for conducting an arithmetic process to transform the predetermined operation route of the force sense imparting type input device 100 based on a rotation angle detection signal which is output in accordance with the rotation of the steering of the vehicle and the operation route data stored in the storage unit 200, to impart a force sense to the force sense imparting type input device 100 based on a result of the arithmetic process.

Figure 1:
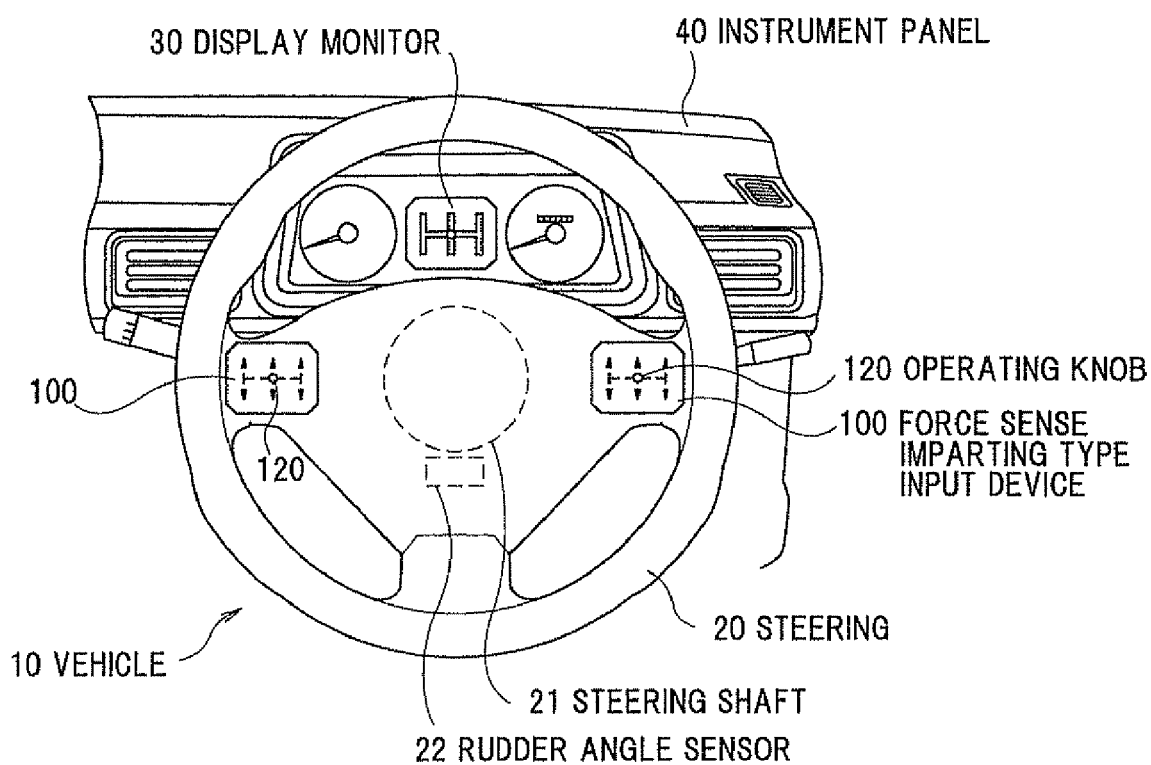
FIG. 1 is a diagram showing a position for use of a force sense imparting type input device 100 mounted in a vehicle 10.

FIG. 1 is a diagram showing a position for use of a force sense imparting type input device 100 mounted in a vehicle 10.

Figure 2:
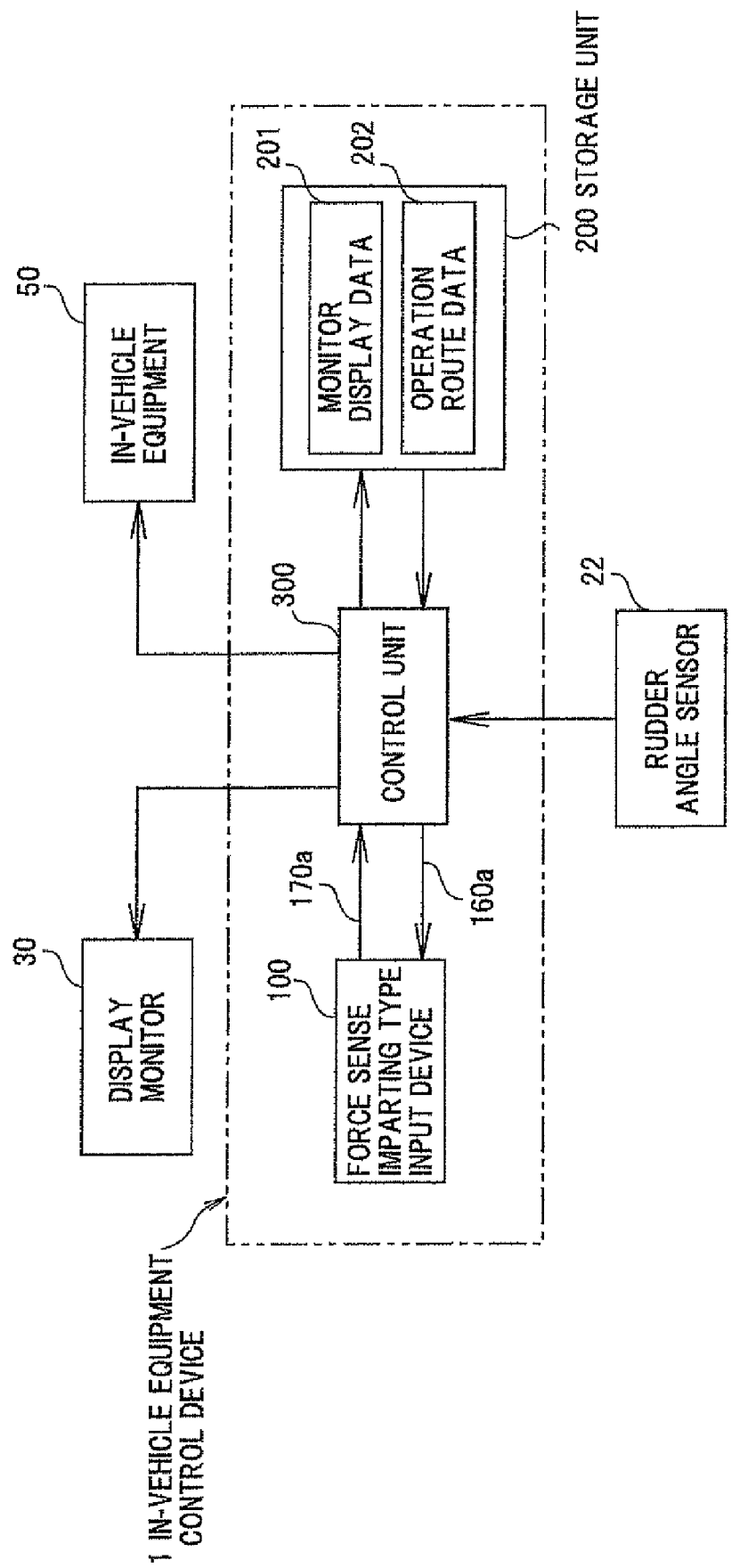
FIG. 2 is a block diagram showing an interconnection of an in-vehicle equipment control device 1 and peripheral devices relating thereto.

FIG. 2 is a block diagram showing an interconnection of an in-vehicle equipment control device 1 and peripheral devices relating thereto.

In FIG. 1, the force sense imparting type input devices 100 are mounted at two positions in right and left of a steering 20. However, for descriptive purpose, the in-vehicle equipment control device 1 in a single force sense imparting type input device 100 will be explained below.

As shown in FIG. 1, the force sense imparting type input device 100 is mounted on the steering 20 of a vehicle 10 and rotated around a steering shaft 21 by the same angle as a rotation angle of the steering 20. A rudder angle sensor 22 for detecting the rotation angle of the steering shaft 21 so as to output a rotation detection angle θ is installed around this steering shaft 21.

Furthermore, a display monitor 30 for indicating the operation route of an operating knob 120 of the force sense imparting type input device 100 is provided on instrument panel 40 etc., for remotely operating an in-vehicle equipment 50 (not shown in FIG. 1, see FIG. 2) mounted on the vehicle 10 by operating the force sense imparting type input device 100. The driver conducts the input operation for the in-vehicle equipment 50, for example, ON/OFF operation, seek operation, mode switching or the like of the audio equipment, by remotely operating the operating knob 120 of the force sense imparting type input device 100 based on the information displayed on the display monitor 30.

As shown in FIG. 2, the force sense imparting type input device 100 is connected to the control unit 300, and position coordinates (x, y) input by the operating knob 120 is output as a position signal 170a to the control unit 300 from the force sense imparting type input device 100. At the same time, a drive signal 160a for imparting the force sense is input to the force sense imparting type input device 100 from the control unit 300. The detail of the force sense imparting type input device 100 will be described later.

The storage unit 200 stores monitor display data 201 for displaying operation patterns of the in-vehicle equipment 50 to be operated on a display monitor 30, and operation route data 202 in the state that the operation patterns of the force sense imparting type input device 100 are not rotated by the steering shaft 21. For example, the monitor display data 201 is stored as a table of the operation pattern $(X_0, Y_0)$, while the operation route data 202 is stored as a table of the position coordinate $(x_0, y_0)$ corresponding to the movement of the operating knob 120. These coordinate tables arc stores in the storage unit 200 for each of the in-vehicle equipments 50 that are various operational objects and are arbitrarily referred as a library in response to a command from the control unit 300.

FIG. 3A is a diagram showing an example of an operation pattern stored as a monitor display data 201 in a storage unit 200, and FIG. 3B is a diagram showing another example of the operation pattern stored as the monitor display data 201 in the storage unit 200.

FIG. 3A shows the example of the operation pattern of an audio equipment as the in-vehicle equipment 50. In upper, lower, left and right directions with respect to a neutral position (center) 31a of the operating knob 120, respective operation positions of +SEEK 31b, −SEEK 31c, VOL 31d, MUTE 31e; AUDIO ON/OFF 31f, and MODE 31g are defined, and an operation route from the neutral position 31a shown in FIG. 3A is stored as an operation pattern table $(X_0, Y_0)$.

FIG. 3B shows the example of the operation pattern of left and right door mirrors and an inner mirror that are installed to the vehicle 10. In the upper, lower, left and right directions with respect to the neutral position (center) 31a of the operating knob 120, respective operation positions of an L-door mirror position 32b, an inner mirror position 32c, to an R-door mirror position 32d, and L-R door mirror storage 32e are defined, and an operation route from the neutral position 31a shown in FIG. 3B is stored as an operation pattern table $(X_0, Y_0)$.

The control unit 300 performs a drive control through interfaces (not shown) for conducting the arithmetic process of rotational transformation of the operation route data 202 based on the rotation detection angle (θ) input from the rudder angle sensor 22, and imparting the force sense to the force sense imparting type input device 100 based a result of this arithmetic process and the position coordinates (x, y) input from the force sense imparting type input device 100. At the same time, the in-vehicle equipment 50 to be operated is remotely operated based on the input operation information of the force sense imparting type input device 100.

FIG. 4A is a perspective view showing a configuration of the force sense imparting type input device 100 and FIG. 4B is an exploded perspective view showing a part of a voice coil motor 160.

The force sense imparting type input device 100 comprises a base 110 to be mounted on the steering 20 of the vehicle 10, a cover 111 for covering the base 110, an operating knob 120 installed on the cover 111 to be projected from the cover 111 such that the driver can operate the operating knob 120, a knob shaft 130 in which one end is supported by a two-dimensional spherical bearing 125 mounted on the base 110 and another end is attached to the operation knob 120, an X carriage 140 which butts to the knob shaft 130 in an X direction and slides with the knob shaft 130 in a Y direction to slidably move along the X direction, a Y carriage 150 positioned in orthogonal to the X carriage 140, which butts to the knob shaft 130 in the Y direction and slides with the knob shaft 130 in the X direction to slidably move along the Y direction, a voice coil motor 160 mounted on the X carriage 140 and the Y carriage 150 for imparting the force sense respectively, and a liner potentiometer 170 for detecting travel distances (displacements) of the X carriage 140 and Y carriage 150 respectively.

Here, the X carriage 140 and the Y carriage 150 are supported by liner slide guides 180 installed to the base 1no to be slidably movable in the X and Y directions, respectively.

A linear slide guide 180 comprises a stator 180a fixed to the base 110, and a slider 180b that is fixed to the X carriage 140 or Y carriage 150 and smoothly slidable with the stator 180a. The linear potentiometer 170 is attached to the slider 180b and slides together with the X carriage 140 or Y carriage 150, thereby varying a resistance value. The linear potentiometer 170 detects each of the displacement amounts of the X carriage 140 and the Y carriage 150 by measuring the variation in the resistance value.

Furthermore, the voice coil motor 160 comprises a voice coil 161 fixed on the X carriage 140 or Y carriage 150, and a magnetic circuit 165 comprising a magnet 166 and a yoke 167 made of a soft magnetic material. The voice coil 161 is formed by winding a predetermined conductive wire 162 to have a coil-shape and located such that a magnetic flux generated by the magnetic circuit 165 cuts across the conductive wire 162. As a result, the voice coil 161 is subjected to an electromagnetic force according to the Fleming's left-hand rule by applying the current through the conductive wire 162 and activates the driving force to the X carriage 140 or the Y carriage 150.

(Function of the First Preferred Embodiment)

FIG. 5A is a diagram showing the position of the force sense imparting type input device 100 and the route pattern of the operating knob 120 when the steering 20 is rotated by an angle θ in the counterclockwise direction, FIG. 5B is a diagram showing an example of the operation route pattern of an audio equipment that is displayed on the display monitor 30, and FIG. 5C is a diagram showing the route pattern of the operating knob 120 of the force sense imparting type input device 100 when the rotation angle of the steering 20 is 0.

The operation route pattern of the operation knob 120 of the in vehicle equipment 50 displayed on the display monitor 30 is displayed in a constant state at all times regardless the rotation position of the steering 20. In this embodiment, the audio equipment is selected as an in-vehicle equipment 50 and the operation route pattern of this audio equipment is displayed with reference to the table $(X_0, Y_0)$ stored in the storage unit 200.

As shown in FIG. 5B, as the operation route pattern of the operation knob 120, a route pattern in which it is possible to slidably move to six positions (upper, lower, upper right, lower right, upper left and lower left) from the center along the x-axis or y-axis. This operation route pattern is stored as the table $(x_0, y_0)$ in the storage unit 200.

(The Case that the Rotation Angle of the Steering 20 is 0)

In this case, the operation route pattern of the operation knob 120 is controlled based on the operation route data 202 stored in the storage unit 200 as the table $(x_0, y_0)$. This virtual operation route pattern is a pattern similar to but different in scale from the operation route pattern displayed on the display monitor 30.

The case for moving the operation knob 120 while observing the operation route pattern displayed on the display monitor 30 will be explained. When the operation knob 120 is moved, the knob shaft 130 is moved by an operation of the operation knob 120 to move the X carriage 140 and the Y carriage 150. This movement is output from the liner potentiometer 170 to the control unit 300 as an amount of displacement of the x coordinate or the y coordinates. In the control unit 300, a difference between the x, y coordinates displacement amounts (x, y) and the operation route pattern defined by the operation route data $(x_0, y_0)$ corresponds to a shift amount from the operation route, so that the force sense is imparted to the operation knob 120 as a restraining force to be movable on the operation route pattern. Namely, since an electric current is applied to the conductive wire 162 via a current driver (not shown) based on a control signal corresponding to the shift amount from the operation route to provide a driving force in the voice coil motor 160, this driving force functions as a restraining force to the operation knob 120 via the X carriage 140 or the Y carriage 150 and the knob shaft 130. Therefore, when operating the operation knob 120, only the movement along the predetermined operation route pattern defined as the operation route data $(x_0, y_0)$ is allowed.

For example, the operation route in which the movement is restricted is shown as a broken line 500 in FIGS. 5C and 5D, and it is similar in other drawings.

Furthermore, it is possible to impart the force sense of a moderate operational feeling, a click feeling and the like to the operation knob 120 by controlling the location or the speed based on the x, y coordinates displacement amount (x, y), when operating the operation knob 120 by the movement along the predetermined operation route pattern as described above.

(The Case that the Rotation Angle of the Steering 20 is θ(≠0)).

FIG. 5D is a diagram showing the route pattern of the operating knob 120 of the force sense imparting type input device 100 when the rotation angle of the steering 20 is θ(≠0). The rotation detection angle (θ) is input from the rudder angle sensor 22 to the control unit 300 in accordance with the rotation of the steering 20.

The control unit 300 conducts an arithmetic process for the rotational transformation by the rotation angle θ and the table $(x_0, y_0)$ which is stored in the storage unit 200 as the operation route data 202, in order to create a new operation route data $(x_1, y_1)$ after the rotational transformation as below:

$$x_1 = \cos\theta \cdot x_0 + \sin\theta \cdot y_0, \text{ and}$$

$$y_1 = -\sin\theta \cdot x_0 + \cos\theta \cdot y_0$$

As shown in FIG. 5D, the operation route pattern defined by the new operation route data $(x_1, y_1)$ corresponds to the operation route pattern defined by the operation route data $(x_0, y_0)$ rotated by θ in the clockwise direction. The operation route pattern defined by the new operation route data $(x_1, y_1)$ is a pattern similar to but different in scale from the operation route pattern displayed on the display monitor 30, namely, the operation route patterns in the same direction as the operation route pattern displayed on the display monitor 30. Therefore, even though the steering 20 is rotated, it is sufficient for the driver to operate the operation knob 120 of the force sense imparting type input device 100 in accordance with the display of the display monitor 30.

Meanwhile, in the control unit 300, an arithmetic process of an inverse rotational transformation as below is performed for the displacement amount of the x or y coordinate output from the liner potentiometer 170 by operating the operation knob 120:

$$x' = \cos\theta \cdot x - \sin\theta \cdot y, \text{ and}$$

$$y' = \sin\theta \cdot x + cis\theta \cdot y.$$

An operating signal based on this new operation route data (x', y') is transmitted to the in-vehicle equipment 50, thereby conducting a normal remote operation of the in-vehicle equipment 50.

FIG. 6 is a flow chart showing a control flow in a control unit 300 in the first preferred embodiment.

The control unit 300 performs an arithmetic process for conducting the rotational transformation based on the rotation angle $\theta$ and the table $(x_0, y_0)$ that is the operation route data 202 stored in the storage unit 200, to create the new operation route data $(x_1, y_1)$ after the rotational transformation (Rotational transformation step S101).

Next, in accordance with an operation route pattern defined by the new operation route data $(x_1, y_1)$ is created at the rotational transformation step S101, the force sense is imparted to the force sense imparting type input device 100 (Force sense imparting step S102).

In the first preferred embodiment, it is not necessary to judge as to whether the rotation angle $\theta$ of the steering 20 is zero or not. It is sufficient to perform an arithmetic process by using the rotation angle $\theta$ including zero in the rotational transformation formula shown at S102 in FIG. 6.

(Effect of the First Preferred Embodiment)

According to the first preferred embodiment, following effects can be obtained.

(1) Since it is possible to conduct the same operation as the operation route pattern displayed on the display monitor even though the steering 20 is rotated, it is possible for the driver to easily conduct the remote operation of the in-vehicle equipment 50 by operating the operation knob and to suppress the operational error.

(2) Since it is possible to impart the force sense by the force sense imparting type input device 100 when operating the operation knob, it is possible to learn the operational feeling of the operation knob accurately regardless the vibration of the vehicle.

(3) Since it is possible to store the data of various in-vehicle equipments 50 in the storage unit 200 and display the operation route pattern for each of the in-vehicle equipments 50 on the display monitor 30 by switching, it is possible to operate the various in-vehicle equipments 50 remotely by the force sense imparting type input device 100 mounted on the steering 20.

(In-Vehicle Equipment Control Device in the Second Preferred Embodiment)

In the first preferred embodiment, the force sense is controlled to be imparted in the same direction as the operation route pattern displayed on the display monitor 30 by the rotational transformation of the route pattern of the operation knob 120 in the force sense imparting type input device 100 in accordance with the rotation angle of the steering 20. In the second preferred embodiment, however, it is preferable not to conduct the rotational transformation of the route pattern of the operation knob 120 in some cases, for example, the rotation angle of the steering 20 is small, and the running speed of the vehicle is high.

FIG. 7 is a configuration diagram showing an interconnection of an in-vehicle equipment control device 1 and peripheral devices relating thereto in a second preferred embodiment.

In the second preferred embodiment, the control unit 300 further comprises a judgment unit 301. For example, the judgment unit 301 compares the rotation detection angle ($\theta$) output from the rudder angle sensor 22 or the running speed of the vehicle (v) output from a running speed sensor 23 with a judgment data 203 (a threshold angle $\theta_0$ and a threshold speed $v_0$) stored in the storage unit 200, and judges whether or not to conduct the arithmetic process of the rotational transformation based on the comparison result. The judgment unit 301 may arbitrarily change the algorithm to be easily operated by the driver, for example, judging whether the vehicle 10 is moving or parking, other than the algorithm explained above.

FIG. 8 is a flow chart showing a control flow in a control unit 300 and a judgment unit 301 in the second preferred embodiment.

(Step S201) Angle Judgment Step

In the angle judgment step S201, the rotation detection angle ($\theta$) output from the rudder angle sensor 22 is compared with the judgment data 203 (threshold angle $\theta_0$) stored in the storage unit 200. When the rotation detection angle ($\theta$), namely the rotation angle $\theta$ of the steering 20, is greater than the threshold angle $\theta_0$, the process proceeds to the next step S202. When the rotation detection angle ($\theta$) is not greater than the threshold angle $\theta_0$, the process proceeds to step S204 without conducting the rotational transformation in the control unit 300.

(Step S202) Speed Judgment Step

In the speed judgment step S202, the rung speed v output from the running speed sensor 23 is compared with a judgment data 203 (threshold speed $v_0$) stored in the storage unit 200. For the running speed v, the speed output from a speed indicator (not shown) is used. While the running speed v is less than the threshold speed $v_0$, the process proceeds to the next step S203. When the running speed v is not less than the threshold speed $v_0$, the process proceeds to the step S204 without conducting the rotational transformation in the control unit 300.

(Step S203) Rotational Transformation Step

The rotational transformation imparting step S203 is same as the rotational transformation in the control unit 300 in the first preferred embodiment. Namely the control unit 300 performs an arithmetic process for conducting the rotational transformation based on the rotation angle $\theta$ and the table $(x_0, y_0)$ that is the operation route data 202 stored in the storage unit 200, to create the new operation route data $(x_1, y_1)$ after the rotational transformation.

(Step S204) Force Sense Imparting Step

When the rotation detection angle ($\theta$) is greater than the threshold angle $\theta_0$ and the g speed v is less than the threshold speed $v_0$, the new operation route data $(x_1, y_1)$ is created at the rotational transformation step S203, thereby imparting the force sense to the force sense imparting type input device 100. As a result, the same function as that in the first preferred embodiment is obtained.

Meanwhile, when the rotation detection angle ($\theta$) is not greater than the threshold angle $\theta_0$ or the running speed v is not less than the threshold speed $v_0$, the force sense is imparted to the force sense imparting type input device 100 without conducting the rotational transformation in the control unit 300.

(Effect of the Second Preferred Embodiment)

In addition to the effects of the first preferred embodiment, there are following effects.

Namely, since it is assumed that there in no change in a steering holding position of the driver when the rotation angle of the steering 20 is smaller than the predetermined angle, a sense of discomfort can be reduced by moving along the predetermined operation route pattern defined by the operation route data $(x_0, y_0)$ without conducting the rotational transformation in the force sense imparting type input device 100 which rotates in accordance with the rotation of the steering.

Furthermore, since it is assumed that there in no change in the steering holding position of the driver or that the rotation angle of the steering 20 is small in the case that the running speed v is greater than the threshold speed $v_0$. Therefore, similarly to the above case, the sense of discomfort can be reduced by moving along the predetermined operation route pattern defined by the operation route data $(x_0, y_0)$ without conducting the rotational transformation in the force sense imparting type input device 100 which rotates in accordance with the rotation of the steering.

Although a slide type force sense imparting type input device is used as the force sense imparting type input device 100 in the first and second preferred embodiments, it is possible to use other type of force sense imparting type input device such as joystick type force sense imparting type input device in similar manner.

(In-Vehicle Equipment Control Device in the Third Preferred Embodiment)

In the first preferred embodiment, the force sense is controlled to be imparted in the same direction as the operation route pattern displayed on the display monitor 30 by the rotational transformation of the route pattern of the operation knob 120 in the force sense imparting type input device 100 in accordance with the rotation angle of the steering 20. In the third preferred embodiment, however, the force sense is imparted without conducting the arithmetic process of the rotational transformation in the control unit 300.

In the third preferred embodiment, force sense patterns corresponding to the rotation angle of the steering 20, for example, 0°, ±45°, ±90°, ±135°, and 180° are stored in the storage unit 200.

The control unit 300 compares the rotation angle θ of the steering 20 with the angles as listed above, reads a force sense pattern which is close to the angle as listed above from the storage unit 200, and imparts the force sense by the force sense imparting type input device 100. Since the movement of the force sense imparting type input device 100 and the like is same as that in the first preferred embodiment, the explanation thereof is omitted.

FIG. 9 is a flow chart showing a control flow in a control unit 300 in the third preferred embodiment.

The control unit 300 performs judges to which angle of 0°, ±45°, ±90°, ±135°, and 180° the rotation angle θ of the steering 20 is closest (Rotation angle judgment step S301).

Next, the control unit 300 reads a force sense pattern corresponding to the closest angle judged at the step S301 from the storage unit 200 (Force sense pattern reading step S302).

Then, in accordance with an operation route pattern based on the force sense pattern read at the step S302, the force sense is imparted to the force sense imparting type input device 100 (Force sense imparting step S303).

(Effect of the Third Preferred Embodiment)

According to the third preferred embodiment, since the arithmetic process of the rotational transformation in the control unit 300 is not necessary, it is possible to simplify the algorithm in the control unit 300. Furthermore, it is possible to realize the operation without any sense of discomfort by providing the force sense pattern which is substantially identical to the displayed direction on the display monitor 30, by narrowing a pitch of the force sense pattern, for example, from a 45° pitch to 10° pitch.

Although the invention has been described with respect to the specific embodiments for complete and clear disclosure, the appended claims are not to be therefore limited but are to be construed as embodying all modifications and alternative constructions that may occur to one skilled in the art which fairly fall within the basic teaching herein set forth.

What is claimed is:

1. A method for controlling an in-vehicle equipment control device by a force sense imparting type input device mounted on a steering of a vehicle, for remotely operating an in-vehicle equipment mounted on the vehicle according to a predetermined operation route while imparting a force sense, comprising:

a rotational transformation step of conducting an arithmetic process for a rotational transformation based on a rotation detection angle that is output in accordance with a rotation of the steering of the vehicle and an operation route data stored in a storage unit, to create a new operation route data $(x_1, y_1)$ after the rotational transformation;

a force sense imparting step of imparting the force sense to the force sense imparting type input device based on the new operation route data; and an in-vehicle equipment operation step of creating a new operation route data (x', y') by conducting an arithmetic process for an inverse rotation transformation based on the operation route data $(x_1, y_1)$, thereby remotely operating the in-vehicle equipment, wherein the force sense imparting type input device comprises an operating knob that is only allowed to move along a predetermined operation route pattern defined as the operation route data after the rational transformation, and wherein the rotational transformation step proceeds after an angle judgment step of comparing a rotation detection angle that is output in accordance with a rotation of the steering of the vehicle with a threshold angle $(θ_0)$ stored as a judgment data in the storage unit, and a speed judgment step of comparing a running speed of the vehicle and a threshold speed $(v_0)$ stored as the judgment data in the storage unit.

2. A method for controlling an in-vehicle equipment control device by a force sense imparting type input device mounted on a steering of a vehicle, for remotely operating an in-vehicle equipment mounted on the vehicle according to a predetermined operation route while imparting a force sense, comprising:

a rotational transformation step of conducting an arithmetic process for a rotational transformation based on a rotation detection angle that is output in accordance with a rotation of the steering of the vehicle and an operation route data stored in a storage unit, to create a new operation route data $(x_1, y_1)$ after the rotational transformation;

a force sense imparting step of imparting the force sense to the force sense imparting type input device based on the new operation route data; and an in-vehicle equipment operation step of creating a new operation route data (x', y') by conducting an arithmetic process for an inverse rotation transformation based on the operation route data $(x_1, y_1)$, thereby remotely operating the in-vehicle equipment, wherein the force sense imparting type input device comprises an operating knob that is only allowed to move along a predetermined operation route pattern defined as the operation route data after the rational transformation, and wherein the rotational transformation step comprises a judgment step of judging as to whether the vehicle is running or stopping.

3. The method for controlling the in-vehicle equipment control device according to claim 1, wherein the rotational transformation step proceeds when the rotation angle is judged to be greater than the threshold angle ($\theta_0$) at the angle judgment step and the running speed is judged to be less than the threshold speed ($v_0$) at the speed judgment step.

4. The method for controlling the in-vehicle equipment control device according to claim 1, wherein the in-vehicle equipment operation step proceeds when the rotation detection angle is judged to be less than the threshold angle ($\theta_0$) at the angle judgment step, or when the running speed is judged to be greater than the threshold speed ($v_0$) at the speed judgment step.

* * * * *